Oct. 10, 1950 J. PERZEL 2,524,829
EXTRUSION APPARATUS FOR COATING INSULATION
OVER WIRES AND CABLES
Filed April 14, 1948 3 Sheets-Sheet 2

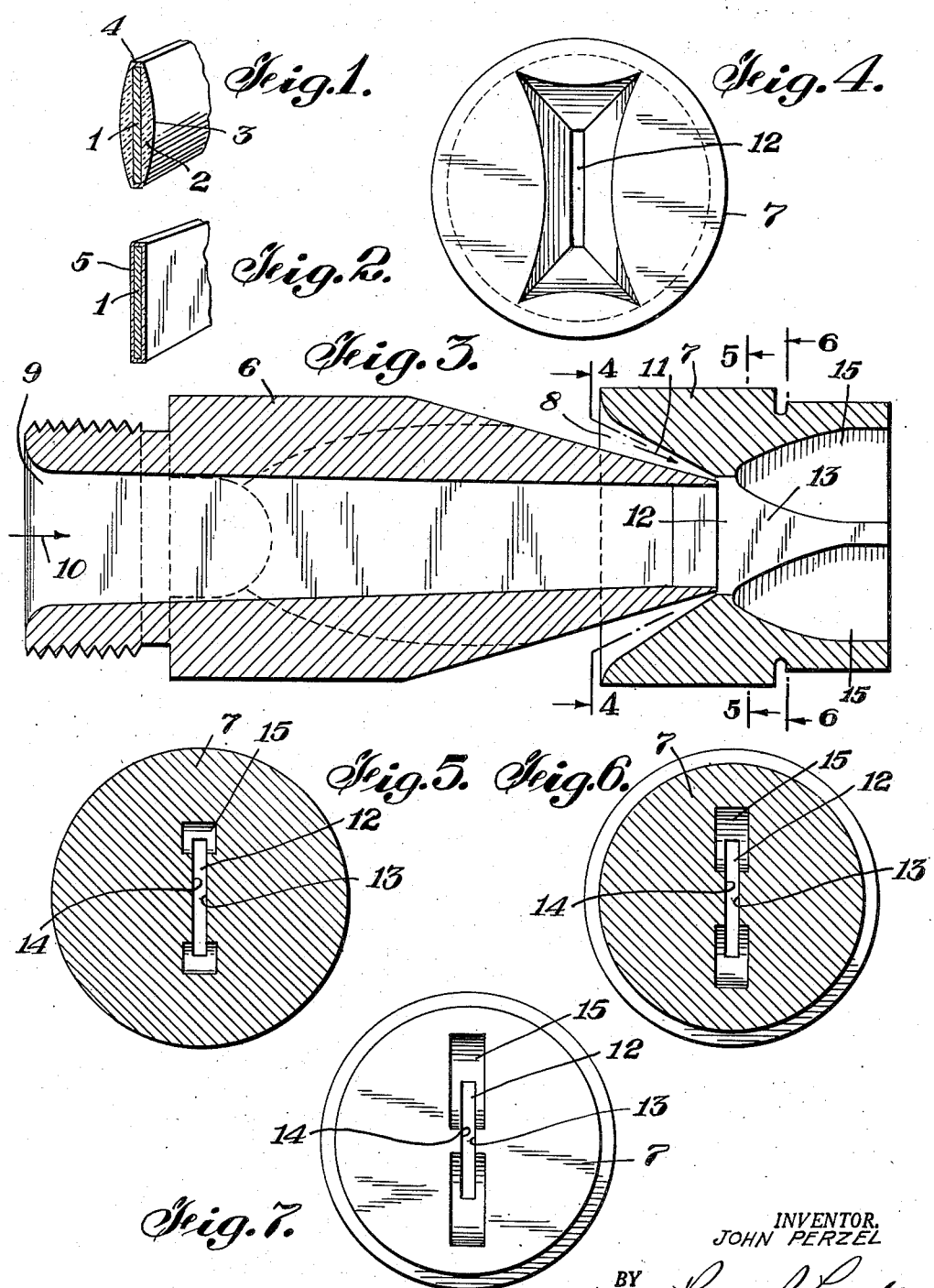

INVENTOR.
JOHN PERZEL
BY
Percy P. Lantz
ATTORNEY

Oct. 10, 1950 J. PERZEL 2,524,829
EXTRUSION APPARATUS FOR COATING INSULATION
OVER WIRES AND CABLES
Filed April 14, 1948 3 Sheets-Sheet 3

INVENTOR.
JOHN PERZEL
BY
*Lucy P. Lantry*
ATTORNEY

Patented Oct. 10, 1950

2,524,829

UNITED STATES PATENT OFFICE 2,524,829

EXTRUSION APPARATUS FOR COATING INSULATION OVER WIRES AND CABLES

John Perzel, Garfield, N. J., assignor to Federal Telephone and Radio Corporation, New York, N. Y., a corporation of Delaware Application April 14, 1948, Serial No. 21,076

11 Claims. (Cl. 18—13)

The present invention relates to extrusion apparatus and, in particular to improvements in extrusion dies utilized in the extrusion of material about a core.

In certain instances it is found desirable to extrude a coating of material about a non-circular or irregular core such that the coacting is of uniform thickness or in substantially exact conformity with the die shape. Where the extrusion die has flat or curved surfaces of large radii and corners or curved surfaces of small radii, a greater flow of material tends to occur adjacent the flat or curved surfaces of larger radii. As a consequence a greater thickness or puffing or swelling up of material appears on the core on the flat or curved surfaces of greater radii than on the corners or curved surfaces of smaller radii. This results in an uneven coating or one which does not conform with the surface of the die orifice.

In jacketing a flat rectangular core, for example, two large and two small surfaces must be coated. The areas between the die and the large flat side surfaces of the core are much greater than the areas between the die and the short flat sides or edges of the core. Obviously, the larger areas provide less restriction to flow of material than the small edge areas so that a greater percentage flow tends to occur in those larger areas or zones of less restriction thereby resulting in a coating having a thickness greater at least along the central portion of the larger flat surfaces of the core.

An attempt was made heretofore to eliminate this non-uniformity in coating by narrowing the area between the core and the large flat or curved surfaces of greater radii and widening the area between the core and the corners or curved surfaces of the smaller radii. While this method to some extent overcame the aforesaid difficulty, it was not satisfactory because it required a die orifice distorted from the extrusion shape desired, which called for difficult calculations and tooling.

This invention overcomes the aforementioned difficulties by equalizing substantially the restriction to flow about the core throughout the cross-section of the die orifice thereby causing a uniform coating of material to be extruded on all the flat and curved surfaces in conformity with the shape of the die orifice. This is accomplished by extending the length of the lands (side walls of the orifice) in the flat or curved surfaces of greater radii. Besides equalizing restriction to flow the extended lands also have an ironing or spreading out effect on the material forced between the core or cores and the flat or curved areas of the die. Increasing the length of the lands also increases the period of time during which the insulating material can "set," thus resulting in better adherence to the core and more exact conformity to the design of the die.

One of the objects of this invention is to provide improved extrusion apparatus whereby a coating or jacket is obtainable which conforms substantially to the shape of the die orifice.

Another object is to provide an extrusion die arrangement which permits the material during extrusion to properly set and adhere uniformly to the core or cores.

The above mentioned and other features and objects of this invention and the matter of attaining them will become more apparent, and the invention itself will be best understood by reference to the following description of the embodiment of the invention taken in conjunction with the accompanying drawing, wherein:

Fig. 1 is a cross-sectional view of a flat-rectangular core coated in accordance with conventional extrusion apparatus;

Fig. 2 is a cross-sectional view of a flat rectangular core coated in accordance with the principles of this invention;

Fig. 3 is a longitudinal cross-section view of one form of extrusion apparatus in accordance with the principles of this invention;

Fig. 4 shows a view of the inlet end of the die with the tip removed;

Figure 8:
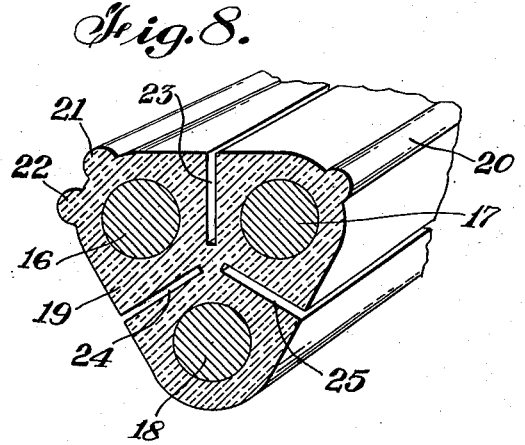
Figure 9:
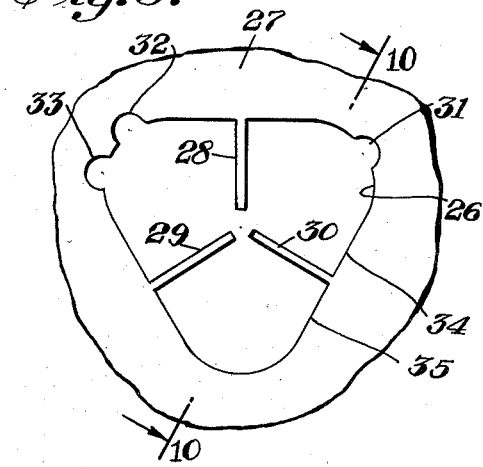
Figure 10:
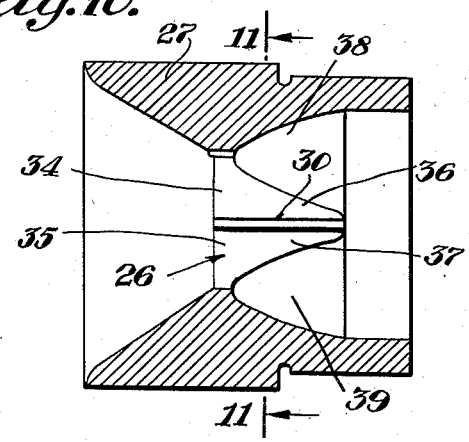
Figure 11:
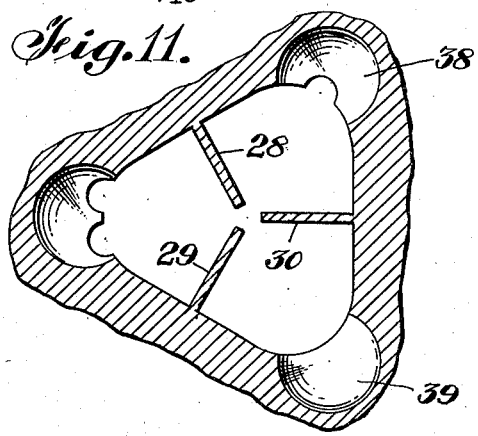
Figure 12:
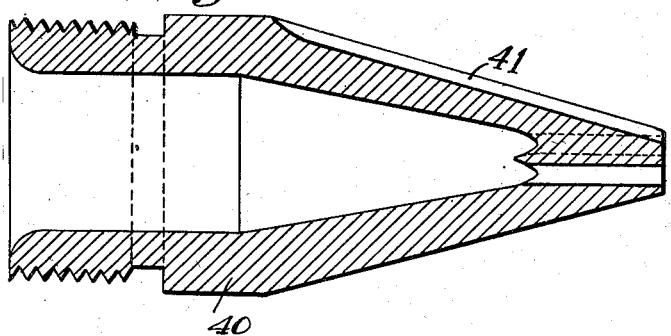
Figure 13:
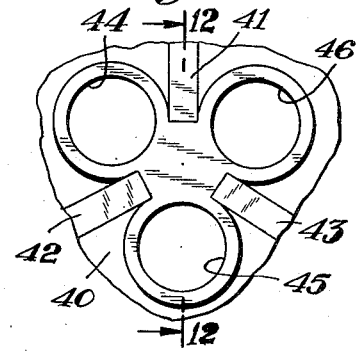
Figure 14:
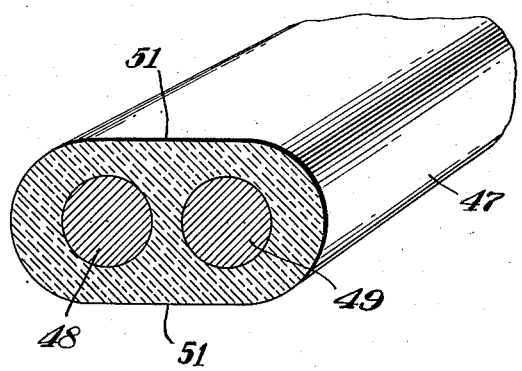
Figure 15:
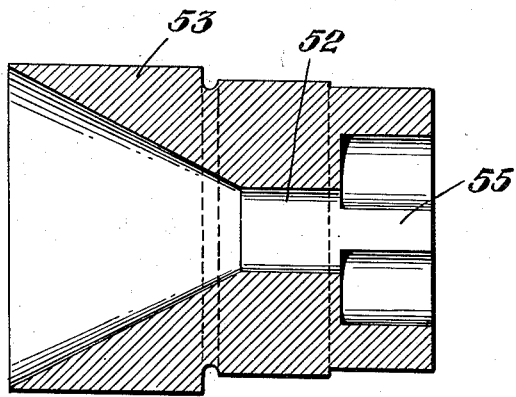
Figure 16:
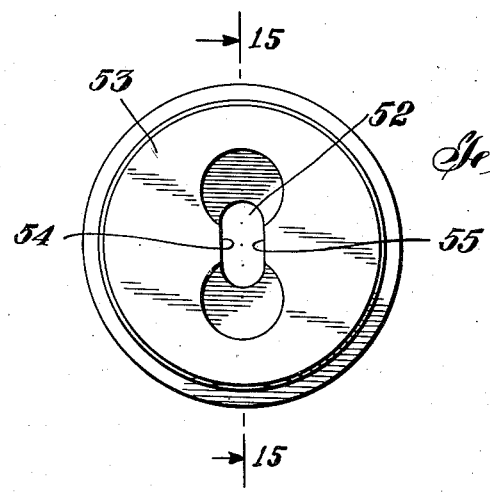

Figs. 5 and 6 are cross-section views of the die taken respectively along lines 5—5 and 6—6 of Fig. 3;

Fig. 7 is a view of the outlet end of the die shown in Fig. 3;

Fig. 8 is an enlarged cross-sectional view of a three-conductor telephone cord;

Fig. 9 is an enlarged view of the outlet end of the die used for extrusion of the cord shown in Fig. 8;

Fig. 10 is a longitudinal sectional view of the die taken along line 10—10 of Fig. 9;

Fig. 11 is a cross-sectional view taken along line 11—11 of Fig. 10;

Fig. 12 is a longitudinal sectional view of a tip used with the die of Figs. 9–11;

Fig. 13 is an enlarged end view of the tip shown in Fig. 12;

Fig. 14 is a cross-sectional view of a two-conductor antenna lead-in cable;

Fig. 15 is a longitudinal sectional view of the die used in the manufacture of cable of Fig. 14, the view being taken along line 15—15 of Fig. 16; and Fig. 16 is a view of the outlet end of the die shown in Fig. 15.

Referring to Fig. 1, the core 1 therein shown comprises a flat rectangular strip, upon which a coating of material has been extruded in accordance with conventional practice. In other words, the rectangular core 1 has been extruded with a coating of material 2 by means of a die having a rectangular shape with orifice walls of uniform length. It is apparent that the coating material flowed more readily over the large flat surfaces, thus resulting in a "swelled up" coating at 3 and a "thinned" coating at 4. It is clear from Fig. 1 that if the coating at 4 is of satisfactory thickness, there is considerable wastage in the swelled thickness on the sides of the strip.

Fig. 2 shows the rectangular core 1 coated with a uniform layer of material 5 in accordance with the principles of the present invention. The product shown in Fig. 2 was obtained by a die shaped as shown in Figs. 3 to 7. The swelled portion of 3 of Fig. 1 was avoided by extending the side walls of the die orifice to a desired length, the extended sides narrowing or tapering off so as to give an ironing or spreading out effect on the coating. The result is that the core is covered with a uniform coating of material as illustrated by Fig. 2.

Only those essential parts of the apparatus are shown in Figs. 3–7 which are necessary to disclose the features of the invention, and these include the extruder tip 6 and the die 7. The material flows onto the core 1 through the space 7 separating the tip 6 and the die 7. Extrusion is accomplished by pulling or forcing the core 1 through the opening 9 of the tip 6 in the direction of the arrow 10, and heated thermoplastic material, such for example as polyethylene or polyvinylchloride, is forced under pressure by a screw or other known means in the direction indicated by arrow 11 through the passage between the tip 6 and the die 7. The heated material has a temperature range of 275° F. – 325° F. and the speed of flow of the material depends upon the thickness of the coating desired, the thicker the coating the slower the flow.

The outer surfaces of the tip 6 and the inner surface of the die 7 are polished to assist in the formation of smooth inner and outer surfaces of the coating 5 applied to the surface of the core 1. The cross-sectional area of the die orifice 12 may be of any desired shape, such as, for example, a narrow rectangle as illustrated in Figs. 3 to 7. If the walls of the orifice were of uniform short length an extruded core such as illustrated in Fig. 1 would be the result. This non-uniformity in coating is due to the orifice of the die being of such shape in cross-section with respect to the core as to present zones having different degrees of restriction to the flow of material. The flat surfaces of greater length offer less resistance to the flow of the material than the corners and short flat surfaces at the edges of the core. For this reason an extrusion is obtained in which the coating is thicker in the middle portions of the large flat sides than on the edges of the core.

As pointed out hereinbefore I overcome this difficulty by extending the orifice wall of the die at 13 and 14 lengthwise of the die in the zone or zones of less restriction. The length of these extensions are proportioned to the degree of less restriction in the corresponding zones to thereby provide an equalizing and an ironing or spreading out effect on the applied material. As viewed in Figs. 3, 5, 6 and 7, the side walls 13 and 14 extend in tapered form to the outlet end of the die block. The degree of tapering corresponds to the increased flow restrictions desired so that substantially the same restrictions to flow exists throughout the cross-section of the orifice. The metal of the die block is cut away from the die proper and the extended lands 13 and 14 as indicated by the cavities 15 in Figs. 3, 5, 6 and 7, thus removing surface drag where not desired.

The die used in this invention is not restricted to any particular shape or size. It may comprise a shape involving three, four or more flat surfaces, the surfaces separated by corners or curved surfaces. Neither need it be restricted to the coating of merely one core but may involve the covering of a number of cores. The size of the die is not necessarily restricted to one size as the thickness of the coating of material may vary depending upon the purpose or material of the core.

Referring to Fig. 8 I show a three-conductor telephone cordage made in accordance with a second embodiment of my invention, Figs. 9 to 13 showing details of the die construction employed. The telephone cordage has three conductors 16, 17 and 18 embedded in insulating material 19. The cross-section of the cordage is triangular in shape, one corner of the triangle being provided with an identifying rib 20 and a second corner having two identifying ribs 21 and 22. The third corner is not provided with any identifying rib since the absence of a rib will distinguish the conductor in that portion from the other two. Dividing the cordage into three sections are three grooves 23, 24 and 25, extending inwardly from the center line of each side wall toward the center of the cordage but stopping short thereof so as to leave sufficient insulating material to hold the three sections together. It will be clear from Fig. 8 that each conductor of the telephone cordage may easily be separated from the other conductors by ripping the insulation between the grooves dividing that section of the cordage from the other two. It will also be clear that each conductor when so separated can be identified by the presence of one or two ribs or the absence of ribs.

Referring more particularly to Figs. 9 to 11, the die orifice 26 of the die 27 as viewed in Fig. 9 corresponds exactly to the outline of the cross-section of the cordage shown in Fig. 8. The die orifice has three fins or vanes 28, 29 and 30 extending inwardly from the center portions of the side walls thereof so as to form grooves 23, 24 and 25 in the extruded cordage. It will be observed that one corner is provided with a groove 31 and another with grooves 32 and 33 by which ribs 20, 21 and 22 are formed.

The corner portions of the die orifice while curved, nevertheless provide a greater restriction to flow than the flat surfaces such as 34 and 35. The vane 30 which divides the two surfaces 34 and 35 add somewhat to the restriction to flow in that area, but vanes 28, 29 and 30 do not in themselves provide sufficient added restriction to equalize the restriction to flow throughout the cross-sectional area of the die orifice. By extending the vanes 28, 29 and 30 beyond the normal outlet surface of the die orifice they will provide a restriction which has an ironing action on the insulating material thereby assisting in the true shaping of the cordage and the grooves 23, 24 and 25. The extension of the vanes, however, is not insurance that the insulating material will not swell or puff out along the flat surfaces 34 and 35. In accordance with my invention, therefore, the walls 34 and 35 of the die orifice are extended in a direction of flow as indicated at 36 and 37. As shown in Fig. 10 the vane 30 is also extended, the maximum extension of the orifice walls and the vane being the same. It will be understood, however, that the two extensions may not be the same, that is, the vanes 28, 29 and 30 may extend beyond the wall extensions 36 and 37, or vice versa, the wall extensions 36 and 37 may be longer than the vanes. The metal of the die is cut away at the corners of the die orifice and along the wall extensions 36 and 37 as indicated at 38 and 39, Figs. 9, 10 and 11.

The tip 40 of Figs. 12 and 13, is received on the inlet side of the die. The grooves 41, 42 and 43 align with the vanes 28, 29 and 30. The conductors 16, 17 and 18 are fed through the tip bores 44, 45 and 46. The tip and die thus provided with the extended vanes and extended orifice walls equalize substantially the restriction to flow of insulating material about the conductors and insures a product having a cross-sectional shape corresponding to substantially that of the irregular surface of the die orifice.

In Figs. 14, 15 and 16, I have illustrated the application of the principles of this invention to still another die orifice configuration. In Fig. 14 a two-conductor antenna lead-in cable 47 is shown wherein two conductors, 48 and 49, are coated with insulating material 50 having two flat sides and two rounded edges. The principle here is similar to that employed in connection with the telephone cordage of Fig. 8. It will be observed that the coating is thickest adjacent the flat surfaces 51 of the cable and that in a die orifice of the same general shape as the cross-section of the cable there would be less restriction to flow in that area. The die orifice 52 of the die 53, Figs. 15 and 16, is accordingly provided with an extension of the side walls thereof as indicated at 54 and 55. While the extensions are indicated as having the same cross-wide dimension throughout their length, they may be tapered or otherwise decreased toward the outlet end of the die, similarly as provided in the first and second embodiments. The extended surfaces 54 and 55 provide for the equalizing of the flow restriction and function to iron out the insulating material during the critical setting stage.

While I have described above the principles of my invention in connection with several specific embodiments, it is to be clearly understood that this description is made only by way of example and not as a limitation of the scope of my invention.

I claim:

1. In an extrusion apparatus having a die for applying material about a core wherein the orifice of the die is of such shape in cross-section with respect to said core as to present zones having different degrees of restriction to the flow of material; the improvement comprising providing the die with an outward extension of the orifice wall along the margin of the direction of flow in the zone of less restriction to equalize substantially the restriction to flow about said core throughout the cross-section of the orifice.

2. In an extrusion apparatus according to claim 1, wherein the extension of the orifice wall decreases in width toward the outlet end of the die.

3. In an extrusion apparatus according to claim 1, wherein the extension of the orifice wall is tapered toward the outlet end of the die, the degree of taper being in accordance with the variation of restriction to flow across the zone.

4. In an extrusion apparatus having a die for applying material about a flat rectangular core wherein the orifice of the die is of a cross-sectional shape similar to the core but has passages larger in at least one cross-sectional dimension along the sides of said core than are provided at the edges thereof, thereby presenting zones offering different degrees of restriction to the flow of material about said core; the improvement comprising an extension of the orifice wall of the die in the direction of flow on the sides opposed to the side walls of said core to equalize substantially the restriction offered to flow of the applied material about said core throughout the cross-section of the orifice.

5. In an extrusion apparatus having a die with an orifice longer in one cross-sectional direction than in the other for applying material about a plurality of spaced cores whereby passage areas of different size are provided about said cores which present different degrees of restriction to the flow of material; the improvement comprising an extension of the orifice wall of the die in the direction of flow portion of the die facing the longer cross sectional axis to equalize substantially the restriction to flow about said cores throughout the cross-section of the orifice.

6. In an extrusion apparatus die having substantially triangular orifice for applying material about three spaced cores whereby passage areas of different size are provided about said cores which have less restriction to the flow of material in the zones adjacent the three side margins of the triangular die orifice; the improvement comprising extensions of the orifice walls of the die along the three margins of the orifice thereof in the direction of flow to conform and maintain the material to the triangular shape of said die orifice until the material has at least partially set.

7. In an extrusion apparatus according to claim 6 wherein said extensions are decreased in width toward the outlet end of the die.

8. In extrusion apparatus according to claim 6, wherein said die has vanes extending inwardly from the center portions of the three margins of the die orifice to partially separate the area thereof into three core areas, whereby the three cores may be easily separated after extrusion by ripping the coating material along grooves produced by said vanes.

9. In extrusion apparatus according to claim 8, wherein the vanes are extended in the direction of flow a distance beyond the side walls of the die orifice to conform the material to the shape of the vanes until the material is at least partially set.

10. In an extrusion apparatus for applying material about a core wherein the die orifice is of such shape in cross-section with respect to said core as to present zones offering different degrees of restriction to the flow of material thereby tending to result in a coating of non-uniform thickness; the improvement comprising an extension of the orifice wall of the die disposed lengthwise of the die in the zone of less restriction, the length of such extension being proportioned to the degree of restriction in the corresponding zone to thereby provide an ironing and spreading out effect on the applied material.

11. In an extrusion apparatus having a die for applying material about a core wherein the orifice of the die is of such shape in cross-section with respect to said core as to present zones offering different degrees of restriction to the flow of material such as to result in a nonuniform coating of said material, the improvement comprising an extension of the orifice walls of the die disposed lengthwise of the die along the margins of the zones of less restriction to a degree correspondsponding inversely to the degree of restriction across each such zone.

JOHN PERZEL.

REFERENCES CITED

The following references are of record in the file of this patent:

UNITED STATES PATENTS

| Number | Name | Date |
| --- | --- | --- |
| 1,717,620 | Page | June 18, 1929 |
| 1,957,212 | Hinsky | May 1, 1934 |
| 1,960,997 | Halloran | May 29, 1934 |
| 2,096,347 | Short | Oct. 19, 1937 |
| 2,205,518 | Duffy | June 25, 1940 |
| 2,230,309 | Reed | Feb. 4, 1941 |